US009208340B2

(12) United States Patent
Lee (10) Patent No.: US 9,208,340 B2
(45) Date of Patent: Dec. 8, 2015

(54) PARALLEL DATA PROCESSING SYSTEM BASED ON LOCATION CONTROL AND METHOD THEREOF

(71) Applicant: Chung Jong Lee, Seoul (KR)

(72) Inventor: Chung Jong Lee, Seoul (KR)

( * ) Notice: Subject to any disclaimer, the term of this patent is extended or adjusted under 35 U.S.C. 154(b) by 150 days.

(21) Appl. No.: 14/012,535

(22) Filed: Aug. 28, 2013

(65) Prior Publication Data
US 2015/0067326 A1 Mar. 5, 2015

(51) Int. Cl.
*G06F 11/30* (2006.01)
*G06F 21/62* (2013.01)
(52) U.S. Cl.
CPC .... *G06F 21/6218* (2013.01); *G06F 2221/2107* (2013.01); *G06F 2221/2111* (2013.01)
(58) Field of Classification Search
CPC .. G06F 12/1408; G06F 21/6218; H04L 9/085
USPC ......................................... 713/165, 167, 193
See application file for complete search history.

(56) References Cited

U.S. PATENT DOCUMENTS

| 6,363,481 | B1 * | 3/2002 | Hardjono ...................... 713/165 |
| 7,035,931 | B1 * | 4/2006 | Zayas et al. ................... 709/229 |
| 8,769,270 | B2 * | 7/2014 | Orsini et al. .................. 713/165 |
| 2004/0049687 | A1 * | 3/2004 | Orsini et al. .................. 713/189 |
| 2008/0091845 | A1 * | 4/2008 | Mills et al. .................... 709/246 |
| 2010/0162002 | A1 * | 6/2010 | Dodgson et al. .............. 713/193 |
| 2012/0226904 | A1 * | 9/2012 | Orsini et al. .................. 713/167 |

* cited by examiner

*Primary Examiner* — Samson Lemma
(74) *Attorney, Agent, or Firm* — Novick, Kim & Lee, PLLC; Jae Youn Kim (57) ABSTRACT

A parallel data processing system based on location control and a method thereof can divide a data into smaller data and store and manage the divided data using a location control technique which divides a file, distributes the divided files, and stores and manages information on corresponding areas. The parallel data processing system includes an encryption and decryption server, a location control server and a storage device. Further, the system may reduce the time required for storing and reading a data and improve the speed of controlling encryption and decryption of the data as a result, by distributing the data in a plurality of storage devices and processing the data in parallel in encrypting, storing and restoring a data which requires security. In addition, performance of a plurality of storage devices and efficiency of the storage may be enhanced.

9 Claims, 7 Drawing Sheets

PARALLEL DATA PROCESSING SYSTEM BASED ON LOCATION CONTROL AND METHOD THEREOF

BACKGROUND OF THE INVENTION

1. Field of the Invention

The present invention relates to a secure data processing system, and more specifically, to a parallel data processing system based on location control and a method thereof, which can divide a data into smaller data and store and manage the divided data using a location control technique which divides a file, distributes the divided files, and stores and manages information on corresponding areas.

2. Background of the Related Art

With the advancement in communication techniques, a large amount of data are transmitted to a server and managed and processed by the server, and users of the data are abruptly increased. However, it is rather required to process the data more rapidly without delay.

To meet such a requirement, a high-performance system having a plurality of processors is used to improve the speed of a processing system, and processing loads are distributed using a plurality of servers in order to improve the processing speed of a web service so that the service may be provided without delay even when a plurality of users connects to the system. In relation to a streaming service, network loads are reduced and the streaming service is smoothly provided using a technique such as a CDN service or the like which dispatches servers at important locations.

In addition, in the case where a large amount of data need to be processed or a large number of operations are required such as a scientific experiment or the like, load of a system may be lowered and data may be processed efficiently without a high-performance system by using a plurality of idle clients connected to a network.

However, a large number of data among the data processed on the network need to be securely protected. Although convenience is enhanced as the data are centralized through networking, security thereof is relatively weakened, and frequent leakage of personal information proves the weakness of security, and this is socially regarded as a serious problem.

Although security communication using an SSL protocol or the like is used in the process of communicating data such as personal information, confidential documents of an enterprise, certificates or the like which need to be securely protected, since the data can be leaked from a server due to negligence of management or an accident such as hacking or the like, it is required to enhance security by encrypting the data stored in a server, and, domestically, it is regulated by the personal information protection law to necessarily encrypt personal information that is to be stored.

However, as the process of encrypting and decrypting a data requires a lot of time compared with general data processing and the data to be processed are increased, a method of efficiently managing and processing the data is required.

SUMMARY OF THE INVENTION

An important aspect of the present invention is that the present inventors recognized certain drawbacks of the related art, as mentioned above. As a result, the present inventors provided a solution to such drawbacks, as follows.

Therefore, the present invention has been made in view of the above problems, and it is an object of the present invention to provide a parallel data processing system which improves the speed of controlling encryption and decryption of data and enhances efficiency of data storage.

To accomplish the above object, according to an embodiment of the present invention, there is provided a parallel data processing system for encrypting, storing and processing data, the system including: an encryption and decryption server for encrypting and decrypting an inputted processing target data according to an encryption algorithm; a location control server for receiving the data encrypted by the encryption and decryption server, separating the data by a predetermined unit, specifying a storage location for storing each of the separated data in a storage device among a plurality of storage devices, and storing the storage location in a location information database; and the plurality of storage devices for receiving and storing the separated data according to the storage location specified by the location control server and transmitting a corresponding data to the location control server when the stored data is called from the location control server.

To accomplish the above object, according to another embodiment of the present invention, there is provided a parallel data processing system for encrypting, storing and processing data, the system including: an encryption and decryption server for encrypting and decrypting an inputted processing target data according to an encryption algorithm; a location control server for receiving the data encrypted by the encryption and decryption server, primarily separating a header part, a body part and a barcode part corresponding to major components of the encrypted data, secondarily separating data of the primarily separated body part by a predetermined unit, specifying a storage location for storing each of the primarily and secondarily separated data in a storage device among a plurality of storage devices, and storing the storage location in a location information database; and the plurality of storage devices for receiving and storing the separated data according to the storage location specified by the location control server and transmitting a corresponding data to the location control server when the stored data is called from the location control server.

To accomplish the above object, according to still another embodiment of the present invention, there is provided a parallel data processing system for encrypting, storing and processing data, the system including: a location control server for separating an inputted processing target data by a predetermined unit, specifying a storage location for storing each of the separated data in a storage device among a plurality of storage devices, and storing the storage location in a location information database; an encryption and decryption server for receiving the data separated by the location control server and encrypting the separated data according to an encryption algorithm; and the plurality of storage devices for receiving and storing the separated and encrypted data according to the storage location specified by the location control server and transmitting a corresponding data to the location control server when the stored data is called from the location control server.

To accomplish the above object, according to an embodiment of the present invention, there is provided a parallel data processing method for encrypting, storing and processing data, the system including: an encryption processing step of receiving an inputted processing target data and encrypting the received data according to an encryption algorithm, by an encryption and decryption server; a data separation step of receiving and separating the encrypted data by a predetermined unit, by a location control server; a storage location information storing step of specifying a storage location for storing each of the separated data in a storage device among a plurality of storage devices and storing the storage location in a location information database, by the location control server; and a data storing step of distributing the separated data to the plurality of storage devices according to the storage location specified at the storage location information storing step.

To accomplish the above object, according to another embodiment of the present invention, there is provided a parallel data processing method for encrypting, storing and processing data, the system including: an encryption processing step of receiving an inputted processing target data and encrypting the received data according to an encryption algorithm, by an encryption and decryption server; a data separation step of receiving the encrypted data, primarily separating a header part, a body part and a barcode part corresponding to major components of the encrypted data, and secondarily separating data of the primarily separated body part by a predetermined unit, by the location control server; a storage location information storing step of specifying a storage location for storing each of the primarily and secondarily separated data in a storage device among a plurality of storage devices and storing the storage location in a location information database, by the location control server; and a data storing step of distributing the separated data to the plurality of storage devices according to the storage location specified at the storage location information storing step.

To accomplish the above object, according to still another embodiment of the present invention, there is provided a parallel data processing method for encrypting, storing and processing data, the system including: a data separation step of separating an inputted processing target data by a predetermined unit, by a location control server; a storage location information storing step of specifying a storage location for storing each of the separated data in a storage device among a plurality of storage devices and storing the storage location in a location information database, by the location control server; an encryption processing step of receiving the data separated by the location control server and encrypting the separated data according to an encryption algorithm, by an encryption and decryption server; and a data storing step of distributing the data processed at the encryption processing step to the plurality of storage devices according to the storage location specified at the storage location information storing step.

The additional features and advantages of the present invention will be described in the following descriptions and partially clarified by the above descriptions or fully informed through the execution of the present invention. The objects and other advantages of the present invention will be implemented particularly by the structure specified in the claims, as well as the following descriptions and attached drawings.

DESCRIPTION OF SYMBOLS

| | | | |
|---|---|---|---|
| 100: | Client | 200: | Data service system |
| 210: | Web server | 300: | Parallel data processing system |
| 310: | Encryption and decryption server | | |
| 320: | Location control server | 330: | Storage device |

DETAILED DESCRIPTION OF THE PREFERRED EMBODIMENT

Hereafter, the present invention will be described in detail with reference to the accompanying drawings.

Figure 1:
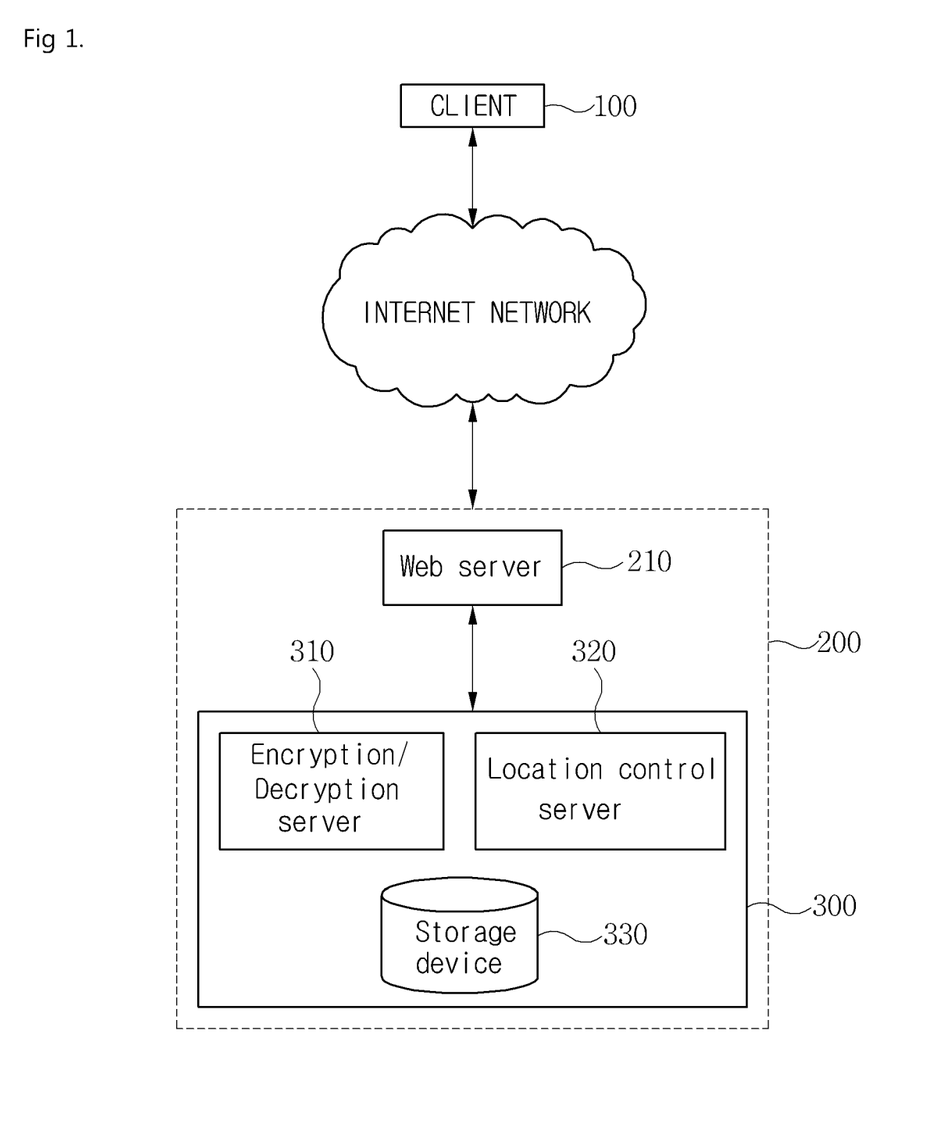
FIG. 1 is a block diagram showing a parallel data processing system according to the present invention.

FIG. 1 is a block diagram showing a parallel data processing system according to the present invention.

The data service system 200 of FIG. 1 includes a web server 210 and a parallel data processing system 300. The data service system 200 may be connected to a client 100 through the Internet, and it is preferable that the parallel data processing system 300 inputs and outputs data through the separate web server 210, rather than allowing the client 100 to directly connect to the parallel data processing system 300, for the security and safety of the system. The web server 210 functions as a gateway of the parallel data processing system 300 toward outside and may apply a method for reinforcing security, such as creating and providing a copy data through a plurality of steps, when further higher security is required. In addition, even when a manager of the data service system 200, not the client 100 connecting through the Internet, connects to the parallel data processing system 300, the manager of the data service system 200 preferably connects to the parallel data processing system 300 by way of the web server 200, rather than directly connecting to the parallel data processing system 300, in order to enhance the security.

Depending on the method of configuring an encryption and decryption server 310 and a location control server 320, it is possible that the encryption and decryption server 310 encrypts a data and then the location control server 320 divides the decrypted data to be distributed to storage devices 330, or the location control server 320 divides a data first and then the encryption and decryption server 310 encrypts the divided data to be distributed to the storage devices 330. Particularly, when a DRM data is processed, a data created as a result of encryption at the encryption and decryption server 310 is divided into elements of a header part, a data part and a barcode part to be separately stored, so that efficiency may be enhanced when a data is searched.

The storage device 330 is preferably configured of a plurality of devices, and since parts of a data are distributed to be stored and read in parallel, the time required for processing the data may be reduced, and since the processing load of the storage device 330 is reduced, performance of the data service system may be efficiently utilized.

Here, although the encryption and decryption server 310 and the location control server 320 are shown as separate servers, this is a configuration of functions, and they may be implemented as separate functions within a system or may be implemented as separate systems. In addition, the processing performance of the encryption and decryption server 310 and the location control server 320 may be enhanced using virtualization and a plurality of systems. In addition, although the encryption and decryption server 310, the location control server 320 and the storage device 330 are preferably configured as separate systems for security, they may be implemented using a plurality of systems connected through a network, like a grid system.

Figure 2:
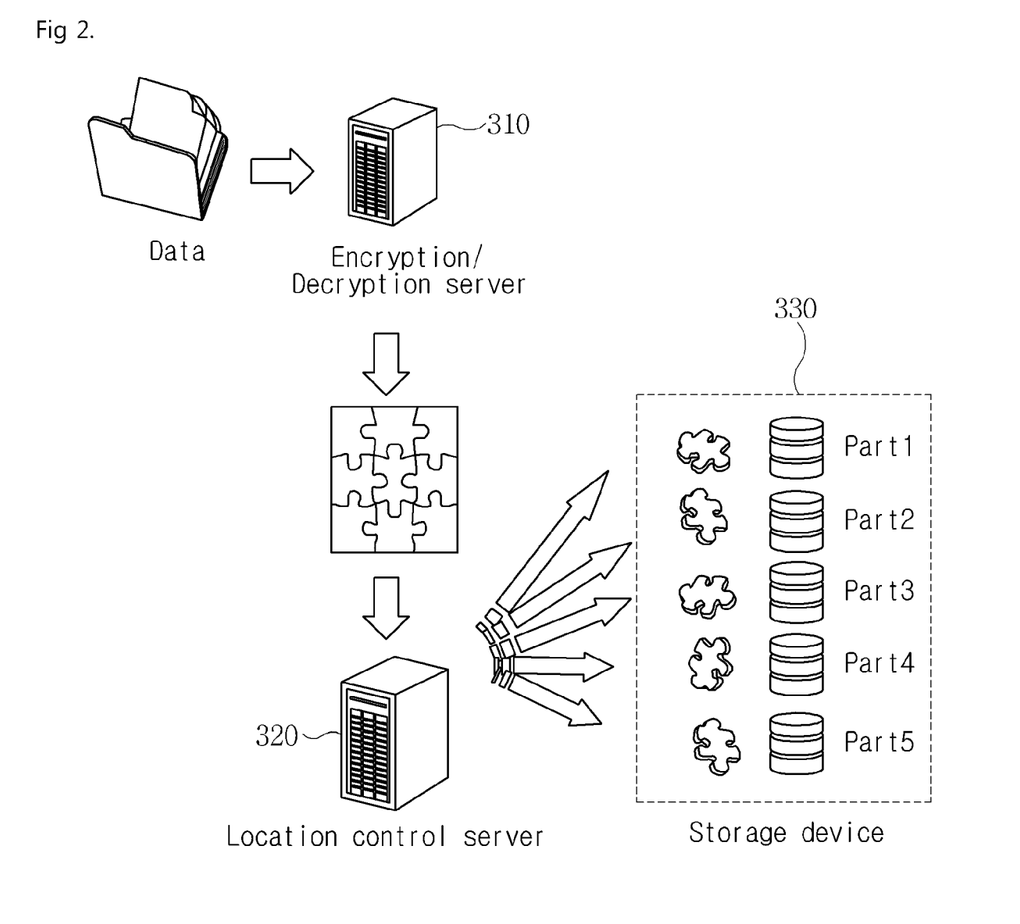
FIG. 2 is a view showing a parallel data processing system based on location control according to a first embodiment of the present invention.

FIG. 2 is a view showing a parallel data processing system based on location control according to a first embodiment of the present invention.

The first embodiment of the present invention relates to a processing method in a parallel data processing system 300 for encrypting a general data, and the encryption and decryption server 310 encrypts an input data and creates a data as a result of the encryption. Here, the algorithm used for the encryption and decryption is not limited, and it is preferable to use a method of an operation level appropriate to the processed data so as to maximize performance of the system while having security of a high level. In addition, when there are a lot of data required to be processed further rapidly, the present invention may configure the encryption and decryption server 310 as a plurality of systems to process the data in parallel or may use a dedicated hardware system.

The location control server 320 performs a function of dividing the data encrypted by the encryption and decryption server 310 so that the data may be distributed in the storage devices 330 and processed in parallel. The unit of dividing the data is preferably a size most efficient for storing the data in the storage devices 330, and information on the storage devices 330 respectively storing each of the divided data is stored in the location control server 320.

The parallel data processing system according to a first embodiment of the present invention processes the divided data on the same criteria in dividing and storing the data in several storage devices 330, and the data may be sequentially stored in each of the storage devices 330 in a round robin method, and the storing method or the sequencing rule are not limited.

When it is requested to read a stored data, the location control server 320 requests the data distributed in each of the storage devices 330 using the location information of the stored data. At this point, since the storage devices 330 only need to search for and provide the data stored in each of the storage devices 330, the request may be processed further rapidly compared with a case of storing the entire data in one storage device. When all the distributed data are collected, the location control server 320 combines the collected data into one data and transfers the combined data to the encryption and decryption server 310, and the encryption and decryption server 310 decrypts and outputs a corresponding data.

The method of the first embodiment is not limited by the type or content of a data and may be applied to all types of data that need to be encrypted and stored.

Figure 3:
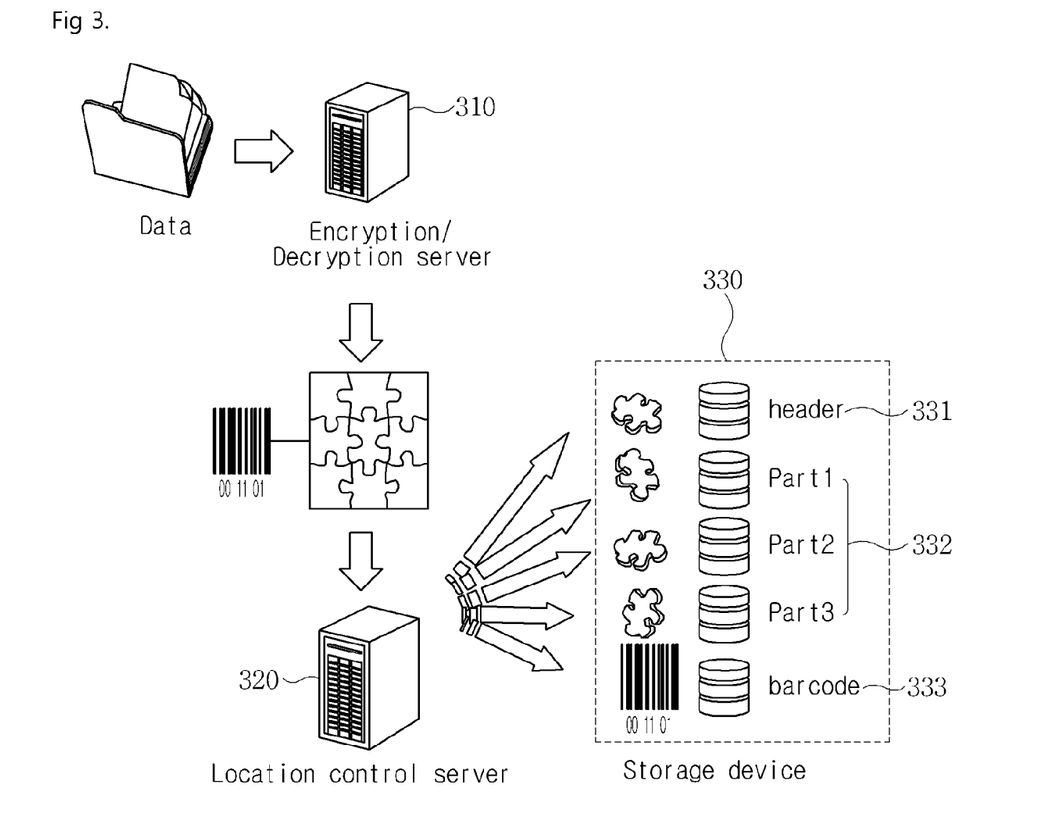
FIG. 3 is a view showing a parallel data processing system based on location control according to a second embodiment of the present invention.

FIG. 3 is a view showing a parallel data processing system based on location control according to a second embodiment of the present invention.

The second embodiment of the present invention may be applied when a specific type of data such as a Digital Rights management (DRM) processing data is encrypted and decrypted, and it is the same as the first embodiment in that the encryption and decryption server 310, the location control server 320 and the storage devices 330 are required and different from the first embodiment in that the storage devices 330 are separated by the function of a data.

Like the first embodiment, if a data is input, the encryption and decryption server 310 encrypts the data and outputs the encrypted data as a result. Here, the encrypted data can be divided into a header part (331), a body part (332) and a barcode part (333). A DRM processing data is included in this category.

The location control server 320 first separates easily divided parts of the encrypted data, which is a processing result of the encryption and decryption server 310, and further divides each of the separated parts if needed. Generally, the header part or the barcode part of the data occupies relatively a small portion of the data. However, since the body part is a data of a large size, the body part is further divided into smaller pieces. Apparently, the header part or the barcode part may be further divided for more rapid and efficient processing, and it is preferable to assign a different storage device 330 to each of the parts depending on the amount of data of the part.

The data divided by the location control server 320 are distributed to the assigned storage devices 330, and the location control server 320 stores information on the storage location of each part.

When it is requested to read a data, the location control server 320 searches for the storage location of each part and requests data from the storage devices 330 in order to read the distributed data, and since the data is primarily separated into the header, the body and the barcode, the corresponding data may be further rapidly searched for. In addition, since the data received from the storage devices 330 are transmitted to the encryption and decryption server 310 in order of importance of each part so as to be decrypted first, the overall decryption processing time may be reduced.

Figure 4:
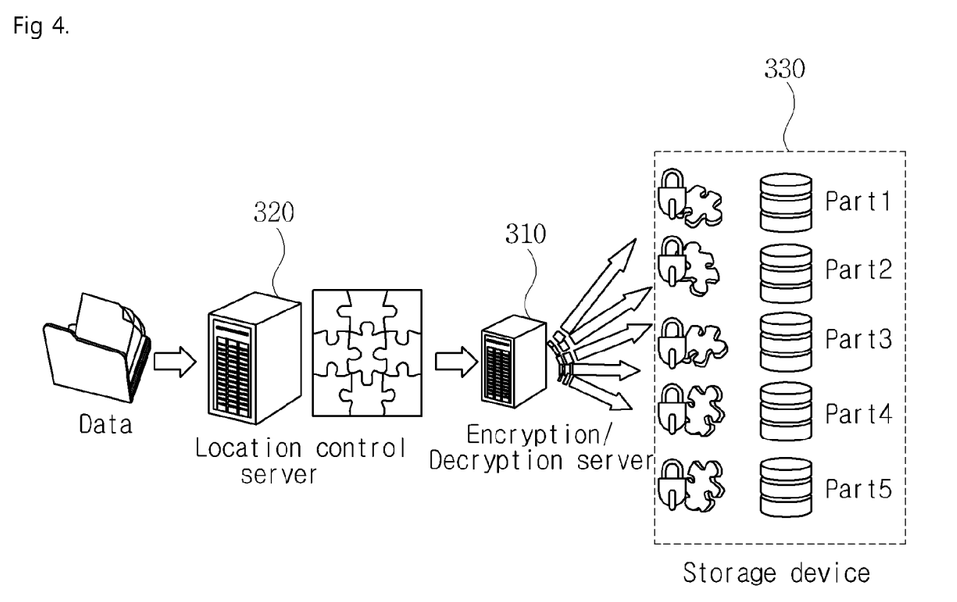
FIG. 4 is a view showing a parallel data processing system based on location control according to a third embodiment of the present invention.

FIG. 4 is a view showing a parallel data processing system based on location control according to a third embodiment of the present invention.

Unlike the first and second embodiments, the processing method according to the third embodiment of the present invention first processes a data in the location control server 320, and the encryption and decryption server 310 encrypts the data before the divided data are distributed to the storage devices 330.

The location control server 320 divides the input data, stores information on in which storage device 330 the divided data will be stored, and transmits the divided data to each of the storage devices 330. At this point, if the input data is a type of data following a specific rule, the location control server 320 primarily separates major parts of the data, additionally divides the separated data if needed, and stores divided data in different storage devices 330 by the major part.

The data separated by the location control server 320 and transmitted to the storage devices 330 is encrypted by the encryption and decryption server 310. Since the encryption and decryption process generally consumes most of processing time, if the data is divided into parts and encryption and decryption is performed on each part of the data, the overall speed of the system is improved, and the load of the system is reduced. At this point, the encryption and decryption server 310 may be configured next to the location control server 320 in a transparent form so as to automatically encrypt and decrypt all the data flowing between the location control server 320 and the storage devices 330, or the system may be configured to transfer the data from the location control server 320 to the storage devices 330 by way of the encryption and decryption server 310.

When it is requested to read a data, the location control server 320 requests data from the storage devices 330 based on the records of distributed storage, and the encryption and decryption server 310 decrypts each of the partial data transmitted from the storage devices 330 and transmits the encrypted partial data to the location control server 320, and then the location control server 320 combines the encrypted partial data and outputs the combined data, and thus the request may be rapidly processed.

Figure 5:
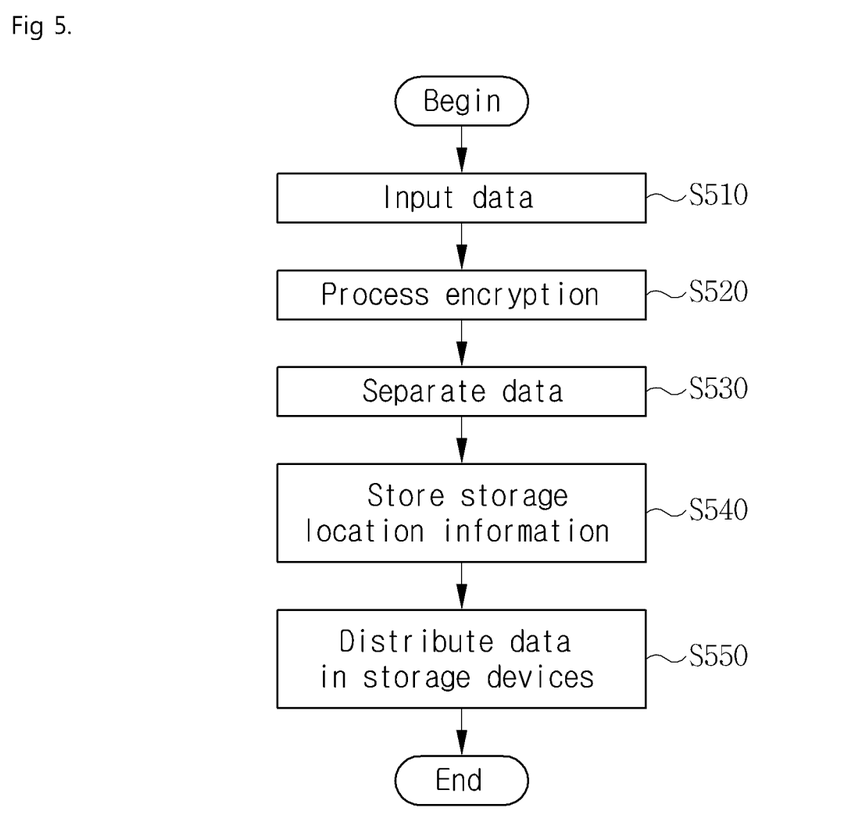
FIG. 5 is a flowchart illustrating a parallel data processing method based on location control according to a first embodiment of the present invention.

FIG. 5 is a flowchart illustrating a parallel data processing method based on location control according to a first embodiment of the present invention.

The parallel data processing method includes the steps of inputting a data into the parallel data processing system 300 S510, encrypting the input data according to an encryption algorithm specified by the encryption and decryption server 310 S520, dividing and separating the data by the location control server 320 if the encrypted data is transmitted to the location control server 320 S530, storing information on in which storage device 330 the separated data will be stored S540, and distributing the encrypted and separated data to the storage devices 330 according to the storage location information. When it is requested to read the stored data, in the reverse sequence of the storing procedure, the data is read by the location control server 320 in the steps of loading partial data of each part from the storage devices 330 based on the storage location information of the partial data, collecting and combining the loaded partial data, and transmitting the combined data to the encryption and decryption server 310 so as to be decrypted.

Figure 6:
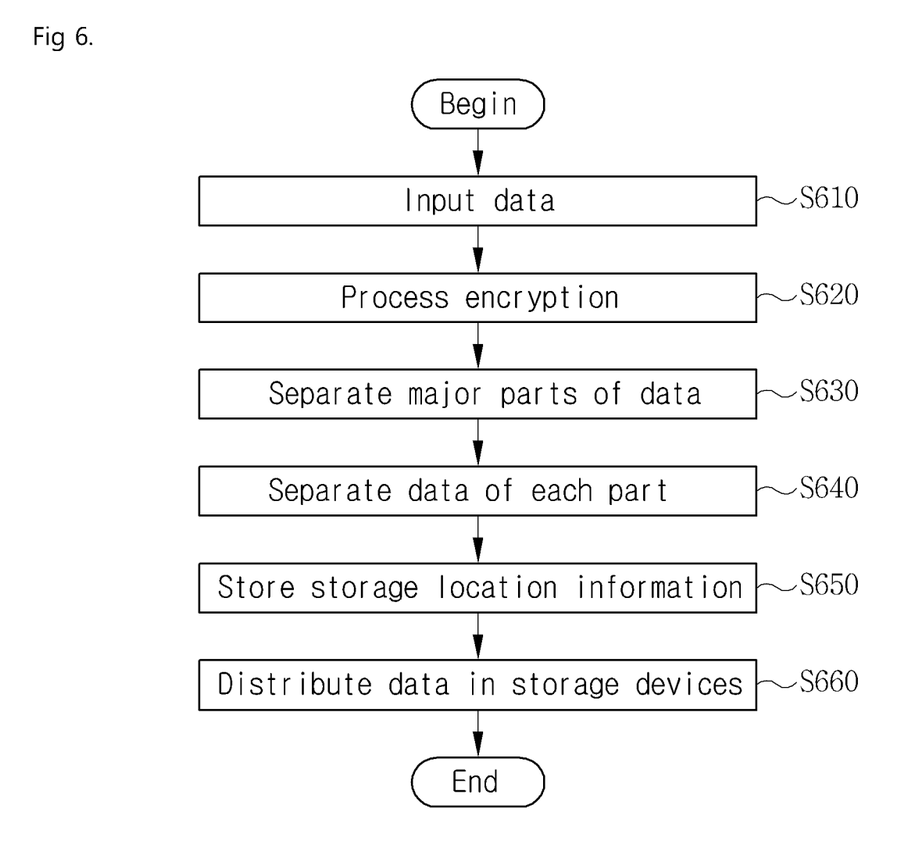
FIG. 6 is a flowchart illustrating a parallel data processing method based on location control according to a second embodiment of the present invention.

FIG. 6 is a flowchart illustrating a parallel data processing method based on location control according to a second embodiment of the present invention.

Compared with the first embodiment, the second embodiment further includes the steps of separating major parts first from the encrypted data received from the encryption and decryption server 310 S630, additionally separating each of the major parts as needed S640, and separately storing partial data of each major part in the storage devices 330 primarily categorized by the major part S650 and S660. In addition, when it is requested to read the stored data, the data is read in the steps of loading partial data of each part distributed in the storage devices 330, combining the partial data of each major part, completing the data by combining the major parts, and transmitting the combined data to the encryption and decryption server 310 so as to be decrypted.

Figure 7:
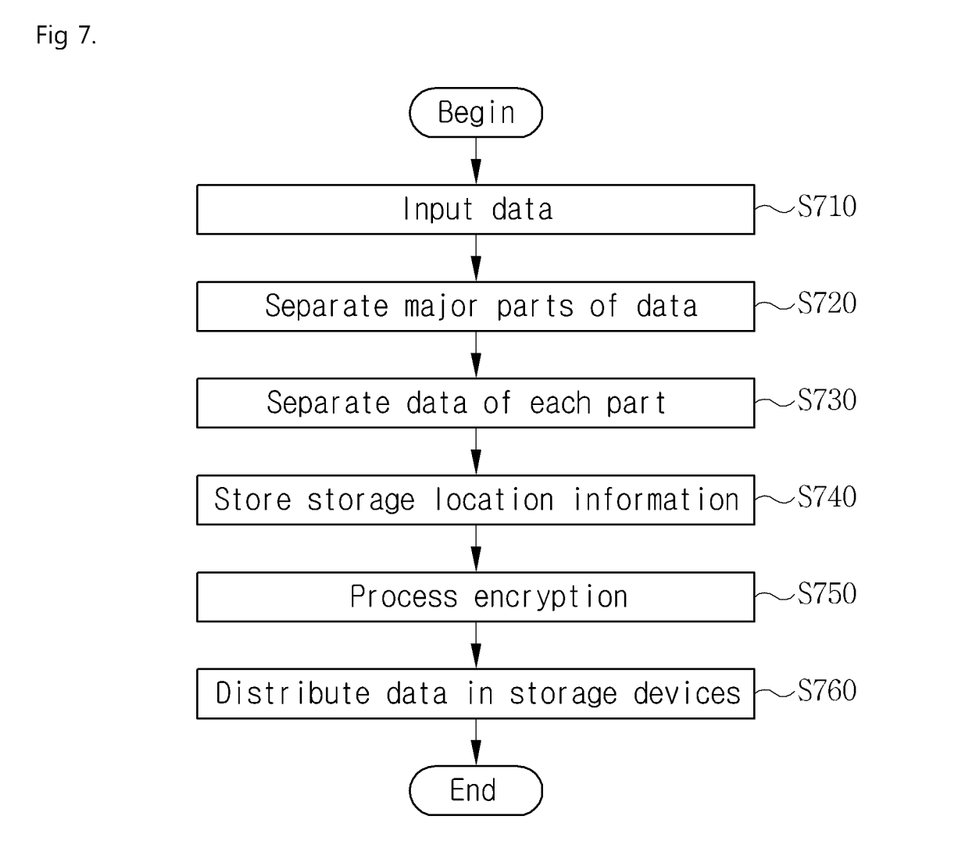
FIG. 7 is a flowchart illustrating a parallel data processing method based on location control according to a third embodiment of the present invention.

FIG. 7 is a flowchart illustrating a parallel data processing method based on location control according to a third embodiment of the present invention.

The parallel data processing method includes the steps of inputting a data into the parallel data processing system 300 S710, separating the input data into major parts S720, additionally separating each of the major parts into partial data as needed S730, storing a storage location of each of the separated data S740, receiving and encrypting, by the encryption and decryption server 310, the partial data transmitted from the location control server 320 to the storage device 330 S750, and distributing the encrypted partial data to the storage devices 330 S760. The step of separating the major parts of the input data first S720 may be omitted depending on the type of a processed data.

When it is requested to read a data, the request is processed in the steps of loading the partial data distributed in the storage devices 330 based on the data storage location information stored in the location control server 320, decrypting the loaded partial data through the encryption and decryption server 310, and combining the decrypted data and outputting the combined data by the location control server 320.

The present invention described above may reduce the time required for storing and reading a data and improve the speed of controlling encryption and decryption of the data as a result, by distributing the data in a plurality of storage devices and processing the data in parallel in encrypting, storing and restoring a data which requires security. In addition, performance of a plurality of storage devices and efficiency of the storage may be enhanced.

The 'parallel data processing system based on location control' according to the present invention is not restricted by the embodiments but only by the appended claims. It is to be appreciated that those skilled in the art can change or modify the embodiments without departing from the scope and spirit of the present invention.

What is claimed is:

1. A parallel data processing system for encrypting, storing and processing a data, the system comprising:
    an encryption and decryption server for encrypting and decrypting an inputted processing target data according to an encryption algorithm; and
    a location control server for receiving the data encrypted by the encryption and decryption server, primarily separating the encrypted data into a header part, a body part and a barcode part corresponding to major components of the encrypted data, secondarily separating data of the primarily separated body part into a plurality of data units, specifying a storage location for storing each of the primarily and secondarily separated data in a storage device among a plurality of storage devices, and storing the storage location in a location information database,
    wherein the plurality of storage devices are configured for receiving and storing the separated data according to the storage location specified by the location control server and transmitting a corresponding data to the location control server when the stored data is called from the location control server.

2. The system according to claim 1, wherein when it is requested to read the data, the location control server collects and combines the separated data from the plurality of storage devices based on storage information of the location information database and transmits the combined data to the encryption and decryption server.

3. A parallel data processing system for encrypting, storing and processing a data, the system comprising:
    a location control server for primarily separating an inputted processing target data into a header part, a body part and a barcode part, secondarily separating the separated body part into a plurality of data units, specifying a storage location for storing each of the separated data in a storage device among a plurality of storage devices, and storing the storage location in a location information database; and
    an encryption and decryption server for receiving the data separated by the location control server and encrypting the separated data according to an encryption algorithm,
    wherein the plurality of storage devices are configured for receiving and storing the separated and encrypted data according to the storage location specified by the location control server and transmitting a corresponding data to the location control server when the stored data is called from the location control server.

4. The system according to claim 3, wherein when it is requested to read the data, the location control server loads the separated data from the storage devices based on storage information of the location information database, and the data loaded from the storage devices are decrypted by the encryption and decryption server and transmitted to the location control server, and then the location control server collects and combines the decrypted data.

5. A parallel data processing method for encrypting, storing and processing a data, the method comprising:
- an encryption processing step of receiving an inputted processing target data and encrypting the received data according to an encryption algorithm, by an encryption and decryption server;
- a data separation step of receiving the encrypted data, primarily separating the encrypted data into a header part, a body part and a barcode part corresponding to major components of the encrypted data, and secondarily separating the primarily separated body part into a plurality of data units, by the location control server;
- a storage location information storing step of specifying a storage location for storing each of the primarily and secondarily separated data in a storage device among a plurality of storage devices and storing the storage location in a location information database, by the location control server; and
- a data storing step of distributing the separated data to the plurality of storage devices according to the storage location specified at the storage location information storing step.

6. The method according to claim 5, further comprising, when it is requested to read the data, a data combining step of collecting and combining the separated data from the plurality of storage devices based on storage information of the storage location information storing step and transmitting the combined data to the encryption and decryption server.

7. The method according to claim 5, wherein the storage location information storing step assigns a different storage device to each of the major components of the data.

8. A parallel data processing method for encrypting, storing and processing a data, the method comprising:
- a data separation step of primarily separating an inputted processing target data into a header part, a body part and a barcode part and secondarily separating separated body part into a plurality of data units by a location control server;
- a storage location information storing step of specifying a storage location for storing each of the separated data in a storage device among a plurality of storage devices and storing the storage location in a location information database, by the location control server;
- an encryption processing step of receiving the data separated by the location control server and encrypting the separated data according to an encryption algorithm, by an encryption and decryption server; and
- a data storing step of distributing the data processed at the encryption processing step to the plurality of storage devices according to the storage location specified at the storage location information storing step.

9. The method according to claim 8, further comprising:
- a data calling step of, when it is requested to read the data, loading the separated data from the storage devices based on storage information of the storage location information storing step;
- a decryption step of decrypting the loaded data through the encryption and decryption server; and
- a data collection step of collecting and combining the decrypted data.

* * * * *